United States Patent
Ding et al.

(10) Patent No.: US 11,919,225 B2
(45) Date of Patent: Mar. 5, 2024

(54) ADDITIVE MANUFACTURING ASSEMBLIES AND METHODS

(71) Applicant: SAINT-GOBAIN PERFORMANCE PLASTICS CORPORATION, Solon, OH (US)

(72) Inventors: Jian L. Ding, Stow, MA (US); Xipeng Liu, Concord, MA (US); Adam P. Nadeau, Boylston, MA (US); Jean-Marie Lebrun, Allston, MA (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 99 days.

(21) Appl. No.: 16/987,867

(22) Filed: Aug. 7, 2020

(65) Prior Publication Data

US 2021/0039305 A1 Feb. 11, 2021

Related U.S. Application Data

(60) Provisional application No. 62/884,728, filed on Aug. 9, 2019.

(51) Int. Cl.
*B29C 64/112* (2017.01)
*B29C 64/209* (2017.01)
*B29C 64/40* (2017.01)
*B33Y 10/00* (2015.01)
*B33Y 30/00* (2015.01)
*B33Y 70/00* (2020.01)

(52) U.S. Cl.
CPC .......... *B29C 64/112* (2017.08); *B29C 64/209* (2017.08); *B29C 64/40* (2017.08); *B29K 2995/0097* (2013.01); *B33Y 10/00* (2014.12); *B33Y 30/00* (2014.12); *B33Y 70/00* (2014.12)

(58) Field of Classification Search
CPC ..... B29C 64/112; B29C 64/209; B29C 64/40; B33Y 10/00; B33Y 30/00
See application file for complete search history.

(56) References Cited

U.S. PATENT DOCUMENTS

| 7,718,132 B2 | 5/2010 | Thomson et al. |
| 9,688,025 B2 | 6/2017 | Stava et al. |
| (Continued) | | |

FOREIGN PATENT DOCUMENTS

| CN | 106079434 A | 11/2016 |
| CN | 106414025 A | 2/2017 |
| (Continued) | | |

OTHER PUBLICATIONS

International Search Report and Written Opinion for PCT/US2020/045391, dated Nov. 17, 2020, 9 pages.

*Primary Examiner* — Joseph S Del Sole
*Assistant Examiner* — Mohamed K Ahmed Ali
(74) *Attorney, Agent, or Firm* — Abel Schillinger, LLP; Chi Suk Kim

(57) ABSTRACT

Systems and methods are disclosed that include an additive manufacturing assembly having a printing area, a first nozzle comprising a first nozzle having a first aperture diameter and configured to dispense a first material in the printing area, and a second nozzle comprising a second nozzle having a second aperture diameter that is larger than the first aperture diameter and configured to dispense a second material in the printing area.

15 Claims, 2 Drawing Sheets

(56) References Cited

U.S. PATENT DOCUMENTS

| | | | |
|---|---|---|---|
| 10,155,884 B2 | 12/2018 | Kenney et al. | |
| 10,471,652 B2 | 11/2019 | Hofmann et al. | |
| 10,689,491 B2 | 6/2020 | Durban et al. | |
| 2006/0158456 A1 | 7/2006 | Zinniel et al. | |
| 2011/0042859 A1* | 2/2011 | Patel | B29C 64/112 |
| | | | 264/401 |
| 2014/0246809 A1 | 9/2014 | Hofmann et al. | |
| 2015/0147421 A1 | 5/2015 | Te et al. | |
| 2015/0174824 A1 | 6/2015 | Gifford et al. | |
| 2015/0321434 A1 | 11/2015 | Sterman et al. | |
| 2016/0009026 A1 | 1/2016 | Kraibühler et al. | |
| 2016/0159006 A1 | 6/2016 | Wang et al. | |
| 2016/0221261 A1 | 8/2016 | Yamamoto et al. | |
| 2016/0271876 A1 | 9/2016 | Lower | |
| 2017/0001439 A1* | 1/2017 | Foresti | B29C 64/112 |
| 2017/0165908 A1* | 6/2017 | Pattinson | B33Y 80/00 |
| 2017/0165917 A1 | 6/2017 | McKiel, Jr. | |
| 2017/0190118 A1 | 7/2017 | Mire et al. | |
| 2018/0036953 A1* | 2/2018 | Gottschalk-Gaudig | |
| | | | B29C 64/40 |
| 2018/0056582 A1 | 3/2018 | Angelini et al. | |
| 2018/0057682 A1 | 3/2018 | Angelini et al. | |
| 2018/0208785 A1 | 7/2018 | Chopra et al. | |
| 2018/0370141 A1 | 12/2018 | Eller et al. | |
| 2019/0091928 A1* | 3/2019 | Hanano | B29C 64/106 |
| 2019/0232591 A1 | 8/2019 | Sterman et al. | |
| 2020/0108548 A1 | 4/2020 | Frances et al. | |
| 2020/0207017 A1* | 7/2020 | Yuwaki | B29C 64/209 |

FOREIGN PATENT DOCUMENTS

| | | |
|---|---|---|
| CN | 104085111 B | 4/2017 |
| CN | 106827534 A | 6/2017 |
| CN | 107053662 A | 8/2017 |
| JP | 2016022641 A | 2/2016 |
| KR | 1020160024452 A | 3/2016 |
| WO | 2017021957 A1 | 2/2017 |
| WO | 2020127882 A1 | 6/2020 |

* cited by examiner

ADDITIVE MANUFACTURING ASSEMBLIES AND METHODS

CROSS-REFERENCE TO RELATED APPLICATION(S)

This application claims priority under 35 U.S.C. § 119(e) to U.S. Provisional Application No. 62/884,728, entitled "ADDITIVE MANUFACTURING ASSEMBLIES AND METHODS," by Jian L. DING et al, filed Aug. 9, 2019, which is assigned to the current assignee hereof and is incorporated herein by reference in its entirety.

BACKGROUND

Additive manufacturing typically involves the use of a dispensing nozzle or printhead translating relative to a manufacturing surface, sometimes referred to as a substrate or bed, to create layered patterns. As the nozzle or printhead moves relative to the manufacturing surface, it dispenses a material onto the surface or a previously formed layer. Each layer forms a stratum of a manufactured article. Additive manufacturing processes create opportunities for rapid prototype development. Certain industries continue to demand improved performance and faster additive manufacturing speeds without compromising article precision.

BRIEF DESCRIPTION OF THE DRAWINGS

So that the manner in which the features and advantages of the embodiments are attained and can be understood in more detail, a more particular description may be had by reference to the embodiments thereof that are illustrated in the appended drawings. However, the drawings illustrate only some embodiments and therefore are not to be considered limiting in scope as there may be other equally effective embodiments.

The use of the same reference symbols in different drawings indicates similar or identical items.

DETAILED DESCRIPTION

Figure 1:
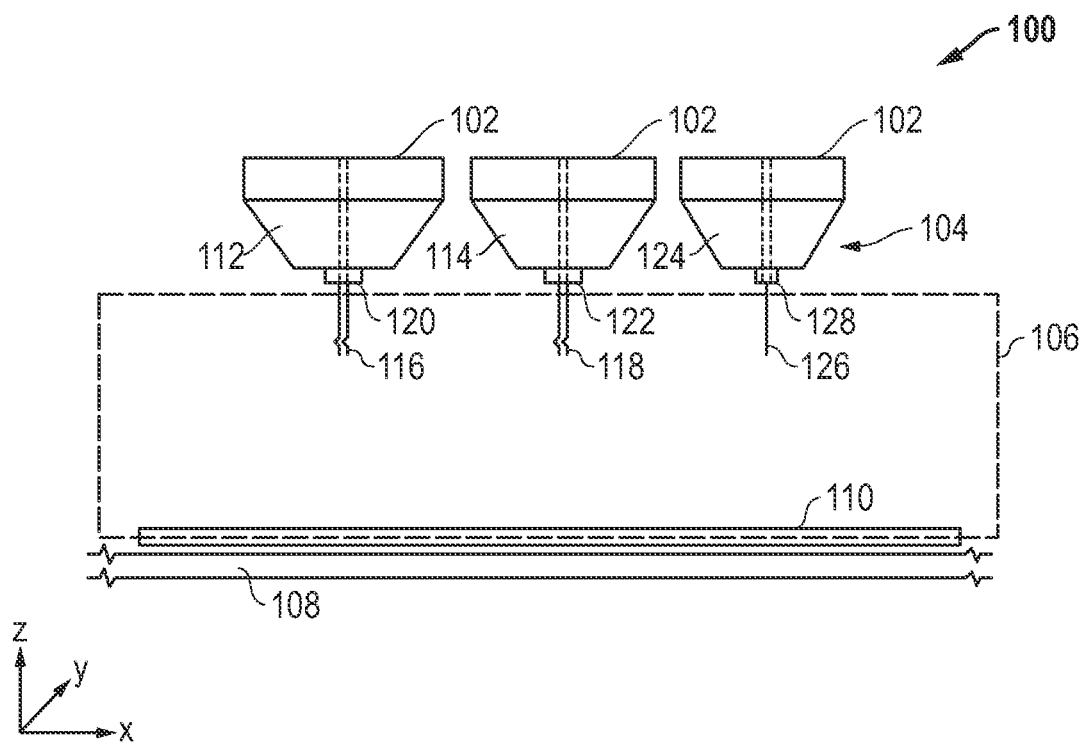
FIG. 1 includes a simplified diagram of an assembly for additive manufacture according to an embodiment of the disclosure.

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The terms "generally," "substantially," "approximately," and the like are intended to cover a range of deviations from the given value. In a particular embodiment, the terms "generally," "substantially," "approximately," and the like refer to deviations in either direction of the value within 10% of the value, within 9% of the value, within 8% of the value, within 7% of the value, within 6% of the value, within 5% of the value, within 4% of the value, within 3% of the value, within 2% of the value, or within 1% of the value.

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the additive manufacturing arts.

Additive manufacturing techniques described herein may utilize multiple nozzle or printhead configurations to dispense manufacturing materials, such as inks, resins, polymers, ceramics, and concrete. In certain embodiments, the material may include silicone, urethane including isocynate and hydroxyl components, epoxy, ceramics, inorganic slurries, polytetrafluoroethylene (PTFE), elastomers such as polyethylene (PE), polypropylene (PP), polycarbonate, polyamide, and other thermoplastic polymers.

Each of a plurality of nozzles may have a unique characteristic. For instance, in some embodiments, an assembly described herein may include a first nozzle having a first characteristic and a second nozzle having a second characteristic different from the first characteristic. The characteristics may include nozzle aperture diameter, texture, shape, or capacity to handle different materials. The nozzles may be configured to act in concert to create a manufactured article having various properties previously unavailable through traditional additive manufacturing techniques.

Additive manufacturing, sometimes referred to as 3D (three-dimensional) printing, may be performed by dispensing material, such as ink—including particles of any chosen materials, onto a manufacturing surface, such as a substrate. The particles are typically microparticles or nanoparticles. As a result of either the printing process or a further processing technique, the particles combine together to form a solid or semisolid (e.g., porous) article.

While reference herein is made generally to dispensing nozzles, in certain embodiments, the described assemblies and methods may be directed to liquid-ejection nozzles synonymous with inkjet printing or dispensing-type printing. In certain instances, the use of the term "nozzle" may further refer to nozzles more traditional of extrusion-type additive manufacturing processes. Use of the term "material" with reference to particles passed through the nozzles may refer to any particles applicable to additive manufacturing processes.

In an embodiment, an assembly described herein may use a dispensing nozzle to dispense material into a printing area containing a substrate. Dispensing may occur over layer-by-layer deposition, whereby each subsequent layer is dispensed onto a previously dispensed layer, with the initial layer disposed on the substrate. Typically, each layer hardens before the subsequent layer is dispensed. In certain instances, the nozzles may dispense each layer in response to the pattern content of that layer. In other instances, the nozzles may blindly dispense layers and a hardening tool may be used to harden the layer according to the layer's specific pattern content. The hardening tool may include, for example, a scanning laser beam or other light source.

In an embodiment, an assembly described herein may utilize multiple types of material for dispensing in the printing area. These multiple material types may include one or more object materials and one or more support materials. Object materials may be used to produce a desired object, such as a final article to be printed and installed or utilized in an end-use application. Support materials may include temporary materials used to support surfaces of the desired object. Support materials may be used, for example, to support overhang surfaces where subsequent layers may sag over negative angles. In some embodiments, support materials may be dispensed from discrete nozzles intended to dispense only the support material, not object material.

Materials used in accordance with embodiments described herein may generally include particles as described above. In more particular embodiments, the materials may include carrier liquid, dissolved or suspended materials, dispersing agents, or any combination thereof. In certain instances, the particles may be disposed in carrier liquid. Dispersing agents may assist in dispersing the particles into the solid. Dissolved and suspended materials may include fillers, fibers, reinforcing materials, and other elements disposed within the material, e.g., within the carrier liquid. The dissolved and suspended materials may provide desirable properties to the object materials, the support materials, or both.

FIG. 1 includes a simplified diagram of an additive manufacturing assembly 100 according to an embodiment of the disclosure. The assembly 100 may generally include a head 102 with a nozzle array 104 disposed adjacent to a printing area 106 having a substrate 108 configured to receive one or more layers 110 of an article being additively manufactured. The head 102, the nozzle array 104, or both may be configured to move in an X-, Y- Z-spatial field. The X-Y plane may be generally parallel with the substrate 108. During the formation of each layer, the nozzle array 104 may move along the X-Y plane to form the pattern associated with the currently-dispensed layer. The Z-axis may represent a step axis whereby each layer represents a different vertical position of the nozzle array 104. In certain instances, the nozzle array 104 may be moved relative to the substrate 108. In other instances, the substrate 108 may move relative to the nozzle array 104. In yet other instances, the substrate 108 and nozzle array 104 may both move relative to each other. For instance, by way of non-limiting example, the nozzle array 104 may move along the Z-axis while the substrate 108 moves in the X-Y plane. Movement of the nozzle array 104 or substrate 108 may occur, for example, as a result of one or more actuators, such as servomotors in communication with a computational processing device.

The nozzle array 104 may include a plurality of nozzles. In some embodiments, the nozzle array 104 may comprise a first nozzle 112 and a second nozzle 114. The first nozzle 112 and the second nozzle 114 may be configured to dispense materials 116, 118, respectively, into the printing area 106. It should be understood that FIG. 1 is not depicted to scale and the nozzles 112, 114 may be closer to the preceding layer 110 than represented during dispensing of a subsequent layer.

In some embodiments, the first nozzle 112 may move independently of the second nozzle 114. In some embodiments, the second nozzle 114 may also move independently of the first nozzle 112. For instance, the first nozzle 112 and the second nozzle 114 may move independently of one another in the X-Y plane. In another embodiment, the first nozzle 112 and the second nozzle 114 may move at a fixed spatial distance. That is, for instance, the first nozzle 112 and the second nozzle 114 may be affixed to the head 102.

In some embodiments, passage of material through the aperture 120 of the first nozzle 112 may occur in a direction along a first line, and passage of material through the aperture 122 of the second nozzle 114 may occur in a direction along a second line parallel with the first line. In other embodiments, the first and second lines may be angularly offset, such as for example by at least 1°, at least 2°, at least 3°, at least 4°, at least 5°, or at least 10°. In another embodiment, the first and second lines may be offset by not greater than 90°, not greater than 45°, not greater than 30°, or not greater than 15°.

In some embodiments, the first nozzle 112 and the second nozzle 114 may have different characteristics as compared to one another. In some embodiments, the first nozzle 112 defines an aperture 120 with a first aperture diameter, $D_1$, and the second nozzle 114 defines an aperture 122 with a second aperture diameter, $D_2$, different than $D_1$. In some embodiments, $D_1$ may be less than $D_2$. In some embodiments, $D_1$ may be not greater than 0.99 $D_2$, not greater than 0.95 $D_2$, not greater than 0.9 $D_2$, not greater than 0.75 $D_2$, not greater than 0.5 $D_2$, or not greater than 0.25 $D_2$. In some embodiments, $D_1$ may be at least 0.01 $D_2$, at least 0.05 $D_2$, at least 0.1 $D_2$, or at least 0.25 $D_2$. Further, it will be appreciated that $D_1$ may be between any of these minimum and maximum values, such as at least 0.01 $D_2$ to not greater than 0.99 $D_2$. In some embodiments, the ratio $D_1:D_2$ may be in a range of 0.01:1 and 0.99:1.

In some embodiments, the first aperture diameter, $D_1$, of the aperture 120 of the first nozzle 112 may be at least 0.5 micrometers (μm), at least 1.0 μm, at least 2.0 μm, at least 3.0 μm, at least 4.0 μm, at least 5.0, at least 7.5 μm, at least 10 μm, at least 12.5 μm, or at least 15 μm. In some embodiments, the first aperture diameter, $D_1$, of the aperture 120 of the first nozzle 112 may be not greater than 200 μm, not greater than 150 μm, not greater than 100 μm, not greater than 50 μm, not greater than 35 μm, not greater than 25 μm, not greater than 22.5 μm, or not greater than 20 μm. Further, it will be appreciated that the first aperture diameter, $D_1$, of the aperture 120 of the first nozzle 112 may be between any of these minimum and maximum values, such as at least 0.5 μm to not greater than 200 μm, or even at least 1.0 μm to not greater than 22.5 μm.

In some embodiments, the second aperture diameter, $D_2$, of the aperture 122 of the second nozzle 114 may be at least 3.0 μm, at least 5.0 μm, at least 10 μm, at least 25 μm, at least 50 μm, at least 100 μm, at least 150 μm, at least 200 μm, at least 250 μm, or at least 500 μm. In some embodiments, the second aperture diameter, $D_2$, of the aperture 122 of the second nozzle 114 may be not greater than 5000 µm, not greater than 2500 µm, not greater than 1500 µm, not greater than 1000 µm, not greater than 750 µm, not greater than 500 µm, not greater than 250 µm, or not greater than 200 µm. Further, it will be appreciated that the second aperture diameter, $D_2$, of the aperture 122 of the second nozzle 114 may be between any of these minimum and maximum values, such as at least 5.0 µm to not greater than 5000 µm, or even at least 250 µm to not greater than 1000 µm.

The differing diameters between the aperture 120 of the first nozzle 112 and the aperture 122 of the second nozzle 114 may facilitate different material deposition characteristics to the nozzles 112, 114. For instance, the second nozzle 114 may be utilized to dispense material at an accelerated volumetric deposition rate while the first nozzle 112 may dispense material at a slower volumetric deposition rate. Accordingly, in some embodiments, the first nozzle 112 may dispense material more precisely than the second nozzle 114. In this regard, computational processing may determine volumetric regions of the article being manufactured that are suitable for high deposition rates (implemented by the second nozzle 114) and other volumetric regions suitable for high precision deposition accuracy (implemented by the first nozzle 114).

In some embodiments, the first nozzle 112 may dispense material at a volumetric deposition rate of at least 1.0 microliters per second (µL/s), at least 2.0 µL/s, at least 3.0 µL/s, at least 3.5 µL/s, at least 5.0 µL/s, at least 10 µL/s, at least 25 µL/s, or at least 50 µL/s. In some embodiments, the first nozzle 112 may dispense material at a volumetric deposition rate of not greater than 2000 µL/s, not greater than 1750 µL/s, not greater than 1700 µL/s, not greater than 1600 µL/s, not greater than 1500 µL/s, not greater than 1250 µL/s, or not greater than 1000 µL/s. Further, it will be appreciated that the first nozzle 112 may dispense material at a volumetric deposition rate between any of these minimum and maximum numbers, such as at least 1.0 µL/s to not greater than 2000 µL/s, or even at least 3.5 µL/s to not greater than 1700 µL/s.

In some embodiments, the second nozzle 114 may dispense material at a volumetric deposition rate of at least 10 µL/s, at least 20 µL/s, at least 25 µL/s, at least 50 µL/s, at least 100 µL/s, at least 150 µL/s, at least 200 µL/s, at least 250 µL/s, or at least 500 µL/s. In some embodiments, the second nozzle 114 may dispense material at a volumetric deposition rate of not greater than 12000 µL/s, not greater than 10000 µL/s, not greater than 5000 µL/s, not greater than 4000 µL/s, not greater than 3000 µL/s, not greater than 2500 µL/s, not greater than 2000 µL/s, or not greater than 1500 µL/s. Further, it will be appreciated that the second nozzle 114 may dispense material at a volumetric deposition rate between any of these minimum and maximum numbers, such as at least 10 µL/s to not greater than 12000 µL/s, or even at least 100 µL/s to not greater than 2000 µL/s.

Additionally, certain material formulations may include small or large particle sizes which restrict minimum nozzle size or may only be dispensed through particular nozzle sizes. In some embodiments, a multi-size nozzle array 104 comprising the first nozzle 112 and the second nozzle 114 may therefore permit use of large particle size materials (implemented by the second nozzle 114) for higher volumetric deposition rates, while simultaneously permitting fine precision dispensing (implemented by the first nozzle 112) at lower volumetric deposition rates.

In some embodiments, the first nozzle 112 may be configured to dispense droplets of material having a droplet size of at least 0.05 picoliters (pL), at least 0.10 pL, at least 0.15 pL, at least 0.20 pL, at least 0.25 pL, at least 0.5 pL, or at least 1.0 pL. In some embodiments, the first nozzle 112 may be configured to dispense droplets of material having a droplet size of not greater than 25 pL, not greater than 20 pL, not greater than 15 pL, not greater than 10 pL, not greater than 9.0 pL, not greater than 8.0 pL, not greater than 7.0 pL, not greater than 6.0 pL, or not greater than 5.0 pL. Further, it will be appreciated that the first nozzle 112 may be configured to dispense droplets of material having a droplet size between any of these minimum and maximum values, such as at least 0.05 pL to not greater than 25 pL, or even at least 0.5 pL to not greater than 9.0 pL.

In some embodiments, the second nozzle 114 may be configured to dispense droplets of material having a droplet size of at least 3 pL, at least 25 pL, at least 50 pL, at least 100 pL, at least 150 pL, at least 200 pL, at least 250 pL, or at least 300 pL. In some embodiments, the second nozzle 114 may be configured to dispense droplets of material having a droplet size of not greater than 5000 pL, not greater than 2500 pL, not greater than 2000 pL, not greater than 1500 pL, not greater than 1000 pL, not greater than 750 pL, not greater than 500 pL, not greater than 250 pL, not greater than 150 pL, or not greater than 100 pL. Further, it will be appreciated that the second nozzle 114 may be configured to dispense droplets of material having a droplet size between any of these minimum and maximum values, such as at least 3.0 pL to not greater than 5000 pL, or even at least 100 pL to not greater than 2000 pL.

In some embodiments, the assembly 100 may further include a support structure nozzle 124 configured to dispense support material 126 through an aperture 128 into the printing area 106. In some embodiments, the support structure nozzle 124 may have a similar shape or structure as compared to the first or second nozzles 112 or 114. In other embodiments, the support structure nozzle 124 may have one or more unique properties suitable for dispensing support material 126. For instance, in some embodiments, the aperture 128 of the support structure nozzle 124 may define a smaller diameter than either or both the first nozzle 112 and the second nozzle 114. In some embodiments, the support structure nozzle 124 may move in fixed relationship with either or both of the first nozzle 112 and/or the second nozzle 114. In other embodiments, the support structure nozzle 124 may move independently of either or both of the first nozzle 112 and/or the second nozzle 114.

In some embodiments, the support structure nozzle 124 may dispense the support material 126 to create a support structure within the printing area 106 prior to dispensing one or more of materials 116, 118 from the nozzles 112, 114, respectively. In some embodiments, the first nozzle 112 and/or the second nozzle 114 may be passive during dispensing of the support structure. In other embodiments, at least one of the first nozzle 112 and the second nozzle 114 may be actively dispensing materials 116, 118 during dispensing of the support material 126 to create the support structure.

In some embodiments, the assembly 100 may be used with various materials, including for example, resins, inks, polymers, ceramics, cements, and silicones. In a particular embodiment, the assembly 100 may be used with photocurable silicone. In a more particular embodiment, the assembly 100 may be used with multiple types of photocurable silicone, such as a first type of photocurable silicone dispensed by the first nozzle 112 and a second type of photocurable silicone dispensed by the second nozzle 114. By way of example, the first photocurable silicone may define a first viscosity, $\mu_1$, and the second photocurable silicone may define a second viscosity. $\mu_2$, different than the first viscosity, $\mu_1$. In some embodiments, the first viscosity, $\mu_1$ may be less than the second viscosity, $\mu_2$. For instance, in some embodiments, $\mu_1$ may be at least $0.0001\mu_2$, $0.001\mu_2$, at least $0.01\mu_2$ or at least $0.1\mu_2$. Moreover, in some embodiments, $\mu_1$ may be not greater than $0.99\mu_2$, not greater than $0.75\mu_2$, not greater than $0.5\mu_2$, or not greater than $0.25\mu_2$. In some embodiments, the first nozzle 112 may be configured to dispense a material having a lower viscosity than the material dispensed through the second nozzle 114. For example, in some embodiments, the first nozzle 112 may dispense a photocurable silicone having a lower viscosity (such as the first viscosity, $\mu_1$) as compared to the photocurable silicone having a higher viscosity (such as the second viscosity $\mu_2$) dispensed through the second nozzle 114.

In some embodiments, the first nozzle 112 may be configured to dispense a first material having a first viscosity, $\mu_1$, of at least 0.005 (centipoise) cP, at least 0.25 cP, at least 0.5 cP, at least 0.75 cP, at least 1.0 cP, at least 1.5 cP, at least 2.0 cP, at least 2.5 cP, or at least 3.0 cP. In some embodiments, the first nozzle 112 may be configured to dispense a first material having a first viscosity, $\mu_1$, of not greater than 25 cP, not greater than 20 cP, not greater than 15 cP, not greater than 12.5 cP, or not greater than 10 cP. Further, it will be appreciated that the first nozzle 112 may be configured to dispense a first material having a first viscosity, $\mu_1$, between any of these minimum and maximum values, such as at least 0.005 cP to not greater than 25 cP, or even at least 0.5 cP to not greater than 12.5 cP.

In some embodiments, the second nozzle 114 may be configured to dispense a second material having a second viscosity, $\mu_2$, of at least 3.0 (centipoise) cP, at least 5.0 cP, at least 10 cP, at least 25 cP, at least 50 cP, at least 100 cP, at least 150 cP, at least 250 cP, at least 500 cP, at least 1000 cP, at least 2500 cP, or at least 5000 cP. In some embodiments, the second nozzle 114 may be configured to dispense a second material having a second viscosity, of not greater than 100000 cP, not greater than 75000 cP, not greater than 50000 cP, not greater than 25000 cP, not greater than 10000 cP, not greater than 5000 cP, not greater than 1000 cP, not greater than 500 cP, not greater than 250 cP, not greater than 200 cP, not greater than 150 cP, or not greater than 100 cP. Further, it will be appreciated that the second nozzle 114 may be configured to dispense a second material having a second viscosity, $\mu_2$, between any of these minimum and maximum values, such as at least 3.0 cP to not greater than 100000 cP, or even at least 5000 cP to not greater than 50000 cP.

Figure 2:
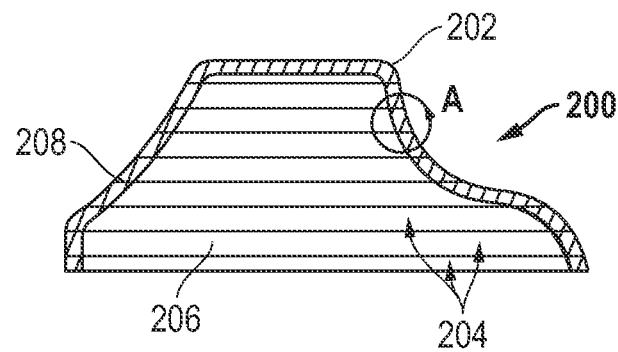
FIG. 2 includes a simplified, cross-sectional view of an article formed according to an embodiment of the disclosure.

FIG. 2 illustrates a simplified, cross-sectional view of an article 200 formed according to an embodiment of the disclosure. The article 200 includes a body 202 formed from a plurality of layers 204. The body 202 includes an inner volume 206 and an outer volume 208. The inner volume 206 may be formed by material 116 dispensed from the second nozzle 114 and the outer volume 208 may be formed by material 118 dispensed from the first nozzle 112 in FIG. 1. While the layers 204 of the inner volume 206 and outer volume 208 align in the simplified view, it should be understood that in certain instances the layers 204 may not be in planar alignment. For example, the layers 204 of the inner volume 206 may be thinner or thicker than the layers 204 in the outer volume 208. In such a manner, the layers 204 may not meet along same planes.

In some embodiments, the inner and outer volumes 206 and 208 may have different material properties. In more particular embodiments, the inner volume 206 and the outer volume 208 may have different moduli of elasticity. For example, the inner volume 206 may include material with a higher or lower modulus of elasticity as compared to the material of the outer volume 208. The end-use application of the article 200 may include both the inner volume 206 and the outer volume 208. Accordingly, in some embodiments, neither the inner volume 206 nor the outer volume may need to be removed prior to using the article 200. In certain instances, the article 200 may be suitable for use in medical products, pharmaceuticals, electronics, automotive or aerospace applications, industrial applications, or any combination thereof.

Figure 3:
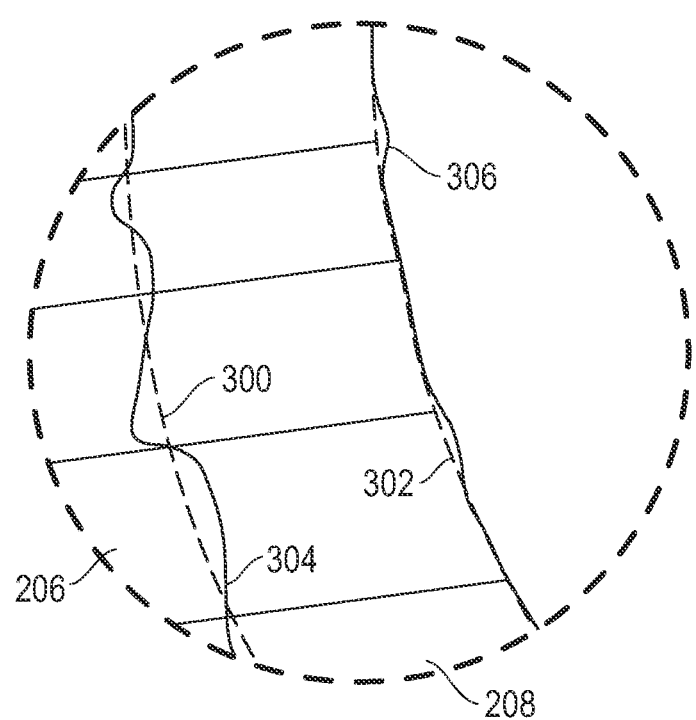
FIG. 3 illustrates an enlarged view of the article as seen in Circle A in FIG. 2 according to an embodiment of the disclosure.

FIG. 3 illustrates an enlarged view of the article 200 as seen in Circle A in FIG. 2. As illustrated, in an embodiment the article 200 may include different surface resolutions as measured at the surface of the inner volume 206 and the surface of the outer volume 208. As used herein, surface resolution describes fidelity of actual surface location to ideal surface location. More specifically, surface resolution may describe the precision of an edge or surface finish of the article 200. Surface resolution may be determined, for instance, by measuring an average distance between the actual surface location and the ideal surface location and inputting the value in the denominator as described in Equation 1.

$$\text{Surface Resolution} = \frac{1}{|avg.\text{ distance between actual and ideal surfaces}|} \quad \text{(Eq. 1)}$$

The higher the value for surface resolution, the more precise the surface resolution. Surface resolution may be determined over an entire area of surface or over a smaller subarea.

In FIG. 3, an ideal surface location of the inner volume 206 is depicted by a dashed line 300. Similarly, an ideal surface location of the outer volume 208 is depicted by a dashed line 302. The actual surface location of the inner volume 206 is depicted by a solid line 304. Similarly, the actual surface location of the outer volume 208 is depicted by a solid line 306. In some embodiments, the inner volume 206 may define a first surface resolution, $SR_1$, and the outer volume 208 may define a second surface resolution, $SR_2$, where $SR_1$ is less than $SR_2$. In some embodiments, $SR_1$ may be not greater than 0.99 $SR_2$, not greater than 0.95 $SR_2$, not greater than 0.9 $SR_2$, not greater than 0.75 $SR_2$, or not greater than 0.5 $SR_2$. In some embodiments, $SR_1$ may be greater than 0.005 $SR_2$. However, in alternative embodiments, $SR_1$ may be equal to $SR_2$.

It is noted that the outer volume 208 may not be limited to exterior surfaces of the article 200. In this context, the outer volume 208 may define an outer surface of the article 200 on an inside of the article 200. That is, for example, the outer volume 208 may define an outer surface of the article 200 within a cavity or void of the article 200. That is, the outer volume 208 may be disposed within, such as entirely within, the article 200 while forming an outer surface of the body of the article 200.

Many different aspects and embodiments are possible. Some of those aspects and embodiments are described herein. After reading this specification, skilled artisans will appreciate that those aspects and embodiments are only illustrative and do not limit the scope of the present invention. Embodiments of an additive manufacturing assembly may be in accordance with any one or more of the embodiments as listed below:

Embodiment 1

An additive manufacturing assembly comprising: a printing area; a first nozzle configured to dispense a first material in the printing area; a second nozzle configured to dispense a second material in the printing area, the first nozzle defining a smaller diameter aperture than the second nozzle; and a support structure nozzle configured to dispense a support structure within the printing area.

Embodiment 2

The assembly of embodiment 1, wherein the first and second nozzles are inkjet nozzles.

Embodiment 3

The assembly of any one of the preceding embodiments, wherein the first and second materials comprise silicone.

Embodiment 4

The assembly of any one of the preceding embodiments, wherein the first and second materials comprise acrylates and acrylic containing materials.

Embodiment 5

The assembly of any one of the preceding embodiments, wherein the first and second materials comprise isocynate, hydroxyl and amine containing materials.

Embodiment 6

The assembly of any one of the preceding embodiments, wherein the first and second materials comprise epoxy functional groups containing materials.

Embodiment 7

The assembly of any one of the preceding embodiments, wherein the first and second materials are photocurable.

Embodiment 8

The assembly of any one of the preceding embodiments, wherein the first material has a lower viscosity, $\mu_1$, than the second material. $\mu_2$.

Embodiment 9

The assembly of embodiment 8, wherein $\mu_1$ is at least 0.0001 $\mu_2$, 0.001 $\mu_2$, at least 0.01 $\mu_2$, or at least 0.1 $\mu_2$.

Embodiment 10

The assembly of any one of embodiments 8 and 9, wherein $\mu_1$ is no greater than 0.99 $\mu_2$, no greater than 0.75 $\mu_2$, no greater than 0.5 $\mu_2$, or no greater than 0.25 $\mu_2$.

Embodiment 11

The assembly of any one of the preceding embodiments, wherein the support structure nozzle is configured to dispense support material simultaneously with the first nozzle.

Embodiment 12

The assembly of any one of the preceding embodiments, wherein the first and second nozzles are configured to simultaneously dispense material.

Embodiment 13

A method of additive manufacture comprising: dispensing a first material from a first nozzle, the first material having a first viscosity, $\mu_1$; dispensing a second material from a second nozzle, the second material having a second viscosity. $\mu_2$, greater than $\mu_1$; moving the first and second nozzles with respect to a printing surface so as to form an article including an outer volume defined by the first material and an inner volume defined by the second material; and using the article in an end-use application while the article includes the inner and outer volumes.

Embodiment 14

The method of embodiment 13, wherein the first nozzle comprises a smaller aperture diameter than the second nozzle.

Embodiment 15

The method of any one of embodiments 13 and 14, wherein dispensing the second material is performed prior to dispensing the first material for at least one layer of the additive manufacturing method.

Embodiment 16

The method of any one of embodiments 13-15, further comprising: dispensing a support structure from a support structure nozzle, wherein the support structure comprises a third material different than the first and second materials.

Embodiment 17

The method of embodiment 16, further comprising removing the support structure.

Embodiment 18

The method of any one of embodiments 13-17, wherein moving the first nozzle is performed at a first speed and moving the second nozzle is performed at a second speed.

Embodiment 19

The method of embodiment 18, wherein the second speed is greater than the first speed.

Embodiment 20

The method of any one of embodiments 13-19, wherein dispensing the first, second, and support materials are performed simultaneously during at least a portion of additive manufacturing.

Embodiment 21

The method of any one of embodiments 13-20, wherein dispensing the first and second materials is performed by inkjet dispensing.

Embodiment 22

The method of any one of embodiments 13-21, wherein the first nozzle is configured to produce a droplet size in a range of 1 pL and 50 µL, in a range of 1 pL and 1 µL, or in a range of 5 pL and 100 pL.

Embodiment 23

The method of any one of embodiments 13-22, wherein the first nozzle comprises an aperture diameter in a range of 1 µm and 2000 µm.

Embodiment 24

An article comprising: a body including an inner volume defined by a first surface resolution and an outer volume defined by a second surface resolution, wherein the second surface resolution is higher than the first surface resolution, and wherein the article is configured for an end-use application with the inner and outer volumes.

Embodiment 25

The article of embodiment 24, wherein the inner and outer volumes comprise different materials.

Embodiment 26

The article of any one of embodiments 24 and 25, wherein the inner and outer volumes comprise materials having different moduli of elasticity.

Embodiment 27

The article of any one of embodiments 24-26, wherein the outer volume comprises a material with a lower elastic modulus than the material of in the inner volume.

Embodiment 28

The article of any one of embodiments 24-27, wherein the outer volume comprises a material with a higher elongation at break than the material of in the inner volume.

Embodiment 29

The article of any one of embodiments 24-28, wherein the inner and outer volumes comprise silicone.

Embodiment 30

An additive manufacturing assembly, comprising: a printing area; a first nozzle comprising a first nozzle having a first aperture diameter and configured to dispense a first material in the printing area; and a second nozzle comprising a second nozzle having a second aperture diameter that is larger than the first aperture diameter and configured to dispense a second material in the printing area.

Embodiment 31

The assembly of embodiment 30, further comprising: a support structure nozzle configured to dispense a support structure within the printing area.

Embodiment 32

The assembly of embodiment 30, wherein the first material and the second material are photocurable.

Embodiment 33

The assembly of embodiment 30, wherein the first material and the second material comprise silicone; acrylates or acrylic containing materials; isocynate, hydroxyl, or amine containing materials; epoxy functional group containing materials; or a combination thereof.

Embodiment 34

The assembly of embodiment 30, wherein the first aperture diameter of the first nozzle is at least 0.5 µm to not greater than 200 µm.

Embodiment 35

The assembly of embodiment 34, wherein the second aperture diameter of the second nozzle is at least 5.0 µm to not greater than 5000 µm.

Embodiment 36

The assembly of embodiment 30, wherein first nozzle is configured to dispense the first material in a first droplet size, and wherein second nozzle is configured to dispense the second material in a second droplet size that is larger than the first droplet size.

Embodiment 37

The assembly of embodiment 36, wherein the first droplet size is at least 0.05 picoliters (pL) to not greater than 25 pL.

Embodiment 38

The assembly of embodiment 37, wherein the second droplet size is at least 3.0 pL to not greater than 5,000 pL.

Embodiment 39

The assembly of embodiment 1 wherein the first material comprises a first viscosity, and wherein the second material comprises a second viscosity that is higher than the first viscosity.

Embodiment 40

The assembly of embodiment 39, wherein the first viscosity is at least 0.005 centipoise (cP) to not greater than 25 cP.

Embodiment 41

The assembly of embodiment 40, wherein the second viscosity is at least 3.0 cP to not greater than 100,000 cP.

Embodiment 42

The assembly of embodiment 30, wherein the first nozzle is configured to dispense the first material at a first volumetric deposition rate, and wherein the second nozzle is configured to dispense the second material at a second volumetric deposition rate that is greater than the first volumetric deposition rate.

Embodiment 43

The assembly of embodiment 42, wherein the first volumetric deposition rate is at least 1.0 microliters per second (µL/s), at least 2.0 µL/s, at least 3.0 µL/s, at least 3.5 µL/s, at least 5.0 µL/s, at least 10 µL/s, at least 25 µL/s, or at least 50 µL/s.

Embodiment 44

The assembly of embodiment 43, wherein the first volumetric deposition rate is not greater than 2000 µL/s, not greater than 1750 µL/s, not greater than 1700 µL/s, not greater than 1600 µL/s, not greater than 1500 µL/s, not greater than 1250 µL/s, or not greater than 1000 µL/s.

Embodiment 45

The assembly of embodiment 44, wherein the second volumetric deposition rate is at least 10 µL/s, at least 20 µL/s, at least 25 µL/s, at least 50 µL/s, at least 100 µL/s, at least 150 µL/s, at least 200 µL/s, at least 250 µL/s, or at least 500 µL/s.

Embodiment 46

The assembly of embodiment 45, wherein the second volumetric deposition rate is not greater than 12000 µL/s, not greater than 10000 µL/s, not greater than 5000 µL/s, not greater than 4000 µL/s, not greater than 3000 µL/s, not greater than 2500 µL/s, not greater than 2000 µL/s, or not greater than 1500 µL/s.

Embodiment 47

The assembly of embodiment 30, wherein the first nozzle and the second nozzle are configured to dispense the first material and the second material simultaneously.

Embodiment 48

A method of additive manufacturing an article, comprising: dispensing a first material from a first nozzle, the first material having a first viscosity; dispensing a second material from a second nozzle, the second material having a second viscosity that is greater than the first viscosity; moving the first and second nozzles with respect to a printing surface so as to form an article including an outer volume defined by the first material and an inner volume defined by the second material.

Embodiment 49

The method of embodiment 48, further comprising: dispensing the first material at a first volumetric deposition rate; and dispensing the second material at a second volumetric deposition rate that is greater than the first volumetric deposition rate.

Embodiment 50

The method of embodiment 49, wherein the first nozzle comprises a first aperture diameter, and wherein the second nozzle comprises a second aperture diameter that is larger than the first aperture diameter.

This written description uses examples to disclose the embodiments, including the best mode, and also to enable those of ordinary skill in the art to make and use the invention. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a

What is claimed is:

1. An additive manufacturing assembly, comprising:
a printing area;
a first nozzle having a first aperture diameter and configured to dispense a first material in the printing area; p1 a second nozzle having a second aperture diameter that is larger than the first aperture diameter and configured to dispense a second material in the printing area, wherein the first material comprises a first viscosity, and wherein the second material comprises a second viscosity that is higher than the first viscosity, wherein the first nozzle is configured to dispense the first material in a first droplet size, and wherein the second nozzle is configured to dispense the second material in a second droplet size that is larger than the first droplet size, wherein the first aperture diameter of the first nozzle is at least 0.5 µm to not greater than 200 µm, wherein the second aperture diameter of the second nozzle is at least 5.0 µm to not greater than 5000 µm; and
a support structure nozzle configured to dispense a support structure within the printing area, and wherein the support structure nozzle, the first nozzle, and the second nozzle each move independently of one another in the X- Y-, Z-spatial field, wherein the first nozzle and the second nozzle are configured to dispense the first material and the second material simultaneously at different positions in the X-, Y-, Z-spatial field.

2. The assembly of claim 1, wherein the first material and the second material are photocurable.

3. The assembly of claim 1, wherein the first material and the second material comprise silicone; acrylates or acrylic containing materials; isocynate, hydroxyl, or amine containing materials; epoxy functional group containing materials; or a combination thereof.

4. The assembly of claim 1, wherein the first droplet size is at least 0.05 picoliters (pL) to not greater than 25 pL.

5. The assembly of claim 4, wherein the second droplet size is at least 3.0 pL to not greater than 5,000 pL.

6. The assembly of claim 1, wherein the first viscosity is at least 0.005 centipoise (cP) to not greater than 25 cP.

7. The assembly of claim 6, wherein the second viscosity is at least 3.0 cP to not greater than 100,000 cP.

8. The assembly of claim 1, wherein the first nozzle is configured to dispense the first material at a first volumetric deposition rate, and wherein the second nozzle is configured to dispense the second material at a second volumetric deposition rate that is greater than the first volumetric deposition rate.

9. The assembly of claim 8, wherein the first volumetric deposition rate is at least 1.0 microliters per second (µL/s), at least 2.0 µL/s, at least 3.0 at least 3.5 µL/s, at least 5.0 µL/s, at least 10 µL/s, at least 25 µL/s, or at least 50 µL/s.

10. The assembly of claim 9, wherein the first volumetric deposition rate is not greater than 2000 µL/s, not greater than 1750 µL/s, not greater than 1700 µL/s, not greater than 1600 µL/s, not greater than 1500 µL/s, not greater than 1250 µL/s, or not greater than 1000 µL/s.

11. The assembly of claim 10, wherein the second volumetric deposition rate is at least 10 µL/s, at least 20 µL/s, at least 25 µL/s, at least 50 µL/s, at least 100 µL/s, at least 150 µL/s, at least 200 µL/s, at least 250 µL/s, or at least 500 µL/s.

12. The assembly of claim 11, wherein the second volumetric deposition rate is not greater than 12000 µL/s, not greater than 10000 µL/s, not greater than 5000 µL/s, not greater than 4000 µL/s, not greater than 3000 µL/s, not greater than 2500 µL/s, not greater than 2000 µL/s, or not greater than 1500 µL/s.

13. The assembly of claim 1, wherein the first nozzle and the second nozzle are configured to dispense the first material and the second material simultaneously.

14. A method of additive manufacturing an article, comprising:
dispensing a first material from a first nozzle, the first material having a first viscosity;
dispensing a second material from a second nozzle, the second material having a second viscosity that is greater than the first viscosity;
providing the support structure nozzle; and
moving the first and second nozzles with respect to a printing surface so as to form an article including an outer volume defined by the first material and an inner volume defined by the second material, wherein the first nozzle dispenses the first material in a first droplet size, and wherein the second nozzle dispenses the second material in a second droplet size that is larger than the first droplet size, wherein the first aperture diameter of the first nozzle is at least 0.5 µm to not greater than 200 µm, wherein the second aperture diameter of the second nozzle is at least 5.0 µm to not greater than 5000 µm, wherein the support structure nozzle, the first nozzle, and the second nozzle each move independently of one another in the X- Y-, Z-spatial field, wherein the first nozzle and the second nozzle are configured to dispense the first material and the second material simultaneously at different positions in the X-, Y-, Z-spatial field.

15. The method of claim 14, further comprising: dispensing the first material at a first volumetric deposition rate; and dispensing the second material at a second volumetric deposition rate that is greater than the first volumetric deposition rate.

* * * * *